US006948017B2

(12) United States Patent
Carpenter et al.

(10) Patent No.: US 6,948,017 B2
(45) Date of Patent: Sep. 20, 2005

(54) METHOD AND APPARATUS HAVING DYNAMICALLY SCALABLE CLOCK DOMAINS FOR SELECTIVELY INTERCONNECTING SUBSYSTEMS ON A SYNCHRONOUS BUS

(75) Inventors: Gary Dale Carpenter, Austin, TX (US); Vikas Chandra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 10/324,741

(22) Filed: Dec. 18, 2002

(65) Prior Publication Data

US 2004/0123178 A1 Jun. 24, 2004

(51) Int. Cl.[7] .............................. G06F 13/00; G06F 1/06
(52) U.S. Cl. ........................ 710/107; 710/105; 713/501
(58) Field of Search ................................ 710/100, 305, 710/105, 107, 110; 713/400, 501, 600, 601

(56) References Cited

U.S. PATENT DOCUMENTS

| | | | | |
|---|---|---|---|---|
| 5,727,171 A | * | 3/1998 | Iachetta, Jr. ................. | 710/107 |
| 5,809,291 A | * | 9/1998 | Munoz-Bustamante et al. ........................... | 713/501 |
| 5,916,311 A | * | 6/1999 | Kakiage ...................... | 710/107 |
| 5,978,869 A | * | 11/1999 | Guthrie et al. ................. | 710/60 |
| 5,987,540 A | * | 11/1999 | Hashiguchi .................... | 710/60 |
| 6,256,320 B1 | * | 7/2001 | Tang et al. .................. | 370/462 |
| 6,510,473 B1 | * | 1/2003 | Voit ............................ | 710/58 |
| 6,600,669 B2 | * | 7/2003 | Trzynadlowski et al. ...... | 363/41 |
| 6,636,912 B2 | * | 10/2003 | Ajanovic et al. ........... | 710/105 |
| 6,789,207 B1 | * | 9/2004 | Maejima ..................... | 713/322 |
| 2003/0163775 A1 | * | 8/2003 | Reese ......................... | 714/752 |

OTHER PUBLICATIONS

PCI Local Bus Specification, Revision 2.2, Dec. 18, 1998, pp. 8, 126, 127, 226, 227.*
"The CoreConnect Bus Architecture", IBM white paper published at http://www-3.ibm.com/chips/products/coreconnect/.

* cited by examiner

*Primary Examiner*—Tim Vo
*Assistant Examiner*—Trisha Vu
(74) *Attorney, Agent, or Firm*—Casimer K. Salys; Anthony V S England

(57) ABSTRACT

In one form, a method for communicating among subsystems coupled to a bus of a computer system on an integrated circuitry chip includes operating subsystems at independent clock frequencies when the subsystems are not communicating with one another on the bus. Selected pairs of the subsystems are operated at a shared clock frequency by selectively varying frequencies of clock signals to the subsystems, so that communication can occur at the shared clock frequency on the bus between the selected subsystems, but at different clock frequencies for respective different pairings of the subsystems, and so that the subsystems can operate at independent clock frequencies when not communicating with other ones of the subsystems. Communication among the subsystems is by a bus-based protocol, according to which when a subsystem is granted access to the bus the subsystem has exclusive use of the bus.

26 Claims, 6 Drawing Sheets

METHOD AND APPARATUS HAVING DYNAMICALLY SCALABLE CLOCK DOMAINS FOR SELECTIVELY INTERCONNECTING SUBSYSTEMS ON A SYNCHRONOUS BUS

This invention was made with Government support under F33615-01-C-1892 awarded by AIR FORCE RESEARCH LAB. The Government has certain rights in this invention.

BACKGROUND

1. Field of the Invention

The present invention concerns synchronous bus operation for systems such as processors, and more particularly concerns dynamically scalable clock domains for selectively interconnecting subsystems on a synchronous bus.

2. Related Art

An issue in the present invention concerns energy consumption of integrated circuitry. It is desirable in some circumstances to lower operating voltage of integrated circuitry because this has a great impact on energy consumption. In general, energy consumption of integrated circuitry is proportional to operating voltage squared. Energy consumption is of increasing importance for circuitry of embedded processors because these processors are often used in portable devices such as personal digital assistants, and these devices are increasingly being used for applications which require greater processing power. These applications include audio playback and graphics rendering, such as for browsing the Internet. It is a side effect, however, of lowering operating voltage that operating frequency is also lowered, although not by as much as energy consumption. For example, cutting operating voltage in half general reduces energy consumption by a factor of four and only reduces operating frequency by a factor of approximately two.

Driven in part by the need for higher performance of embedded controllers applied in portable devices with relatively modest power consumption, there have recently been improvements in the capability for quickly reducing the operating voltage of integrated circuitry, which leads to a need for increased flexibility in operating frequency.

Another issue that's dealt with in the present invention concerns tradeoffs that exist in the design of new systems and the reuse of existing system designs. That is to say, the process of designing embedded controllers generally provides a great deal of opportunity for improvement of overall system performance by improving operating frequency of the processor. However, it generally requires a substantial design effort to increase operating frequency of the subsystems. Consequently there's a certain dynamic at work in system design according to which it would be desirable to redesign some subsystems for a higher operating frequency, particularly the processor, while at the same time reusing at least some old subsystem designs without upgrading the operating frequency of the reused designs. However, this presents a problem, particularly in the case of synchronous buses.

It is conventional to use synchronous buses for embedded processors, such as in the case of the IBM "CoreConnect" bus architecture. ("CoreConnect" is a trademark of IBM Corporation.) Aspects of this bus architecture are described in a white paper, "The CoreConnect Bus Architecture," http://www-3.ibm.com/chips/products/coreconnect, which is hereby incorporated herein by reference. In this architecture, a processor local-bus ("PLB") and a on-chip peripheral bus ("OPB") on an embedded controller are both synchronous buses, according to which devices connected to one or the other of the buses operate in synchronism with a clock signal transmitted on the bus.

Referring now to FIG. 1, devices connected to a conventional OPB 110 are illustrated in a high level view, according to the prior art. A clk 120 signal is provided from an outside source to devices on the OPB 110, including those illustrated, namely an OPB arbiter 130, a first OPB master 140.1, a second OPB master 140.2, and an OPB slave 150.1, and the devices 130, 140.1, etc. run at the same frequency, regulated by clk 120.

In the design of a system with synchronous buses it is problematic to redesign a subsystem to operate at a higher frequency, because according to the current state of the art the synchronous buses in the system need to operate at a frequency that is high enough to be compatible with the highest frequency subsystem, and consequently the redesign of one subsystem requires upgrading all the subsystems connected to the synchronous buses to operate at a higher frequency.

For the above reasons, a need exists to improve flexibility of operating frequency on a synchronous bus.

SUMMARY OF THE INVENTION

The forgoing need is addressed in the present invention, according to which, operating frequencies of subsystems which share a bus are manipulated by selectively varying frequencies of clock signals to the subsystems. In this manner, communication can occur at a shared clock frequency among selected subsystems, but at different clock frequencies for different pairings of subsystems, and when subsystems are not communicating with one another on the bus they can operate at independent clock frequencies.

In an aspect of the present invention, dynamically scalable clock divisors generate temporarily synchronous operation of subsystems responsive to a communication request and existing bus handshake and protocol mechanisms. Communication between the subsystems is enabled by their temporary synchronous operation, and after the communication, the systems return to operating at independent clock frequencies. This permits faster subsystems to operate at a lower frequency during synchronous communication, which is compatible with slower subsystems, but otherwise to operate at a higher frequency, thereby achieving higher performance while maintaining a synchronous bus protocol without upgrading all the subsystems for higher frequency operation.

Additional objects, advantages, aspects, and forms of the invention will become apparent upon reading the following detailed description and upon reference to the accompanying drawings.

DETAILED DESCRIPTION OF A PREFERRED EMBODIMENT

The claims at the end of this application set out novel features which applicants believe are characteristic of the invention. The invention, a preferred mode of use, further objectives and advantages, will best be understood by reference to the following detailed description of an illustrative embodiment read in conjunction with the accompanying drawings.

Figure 1:
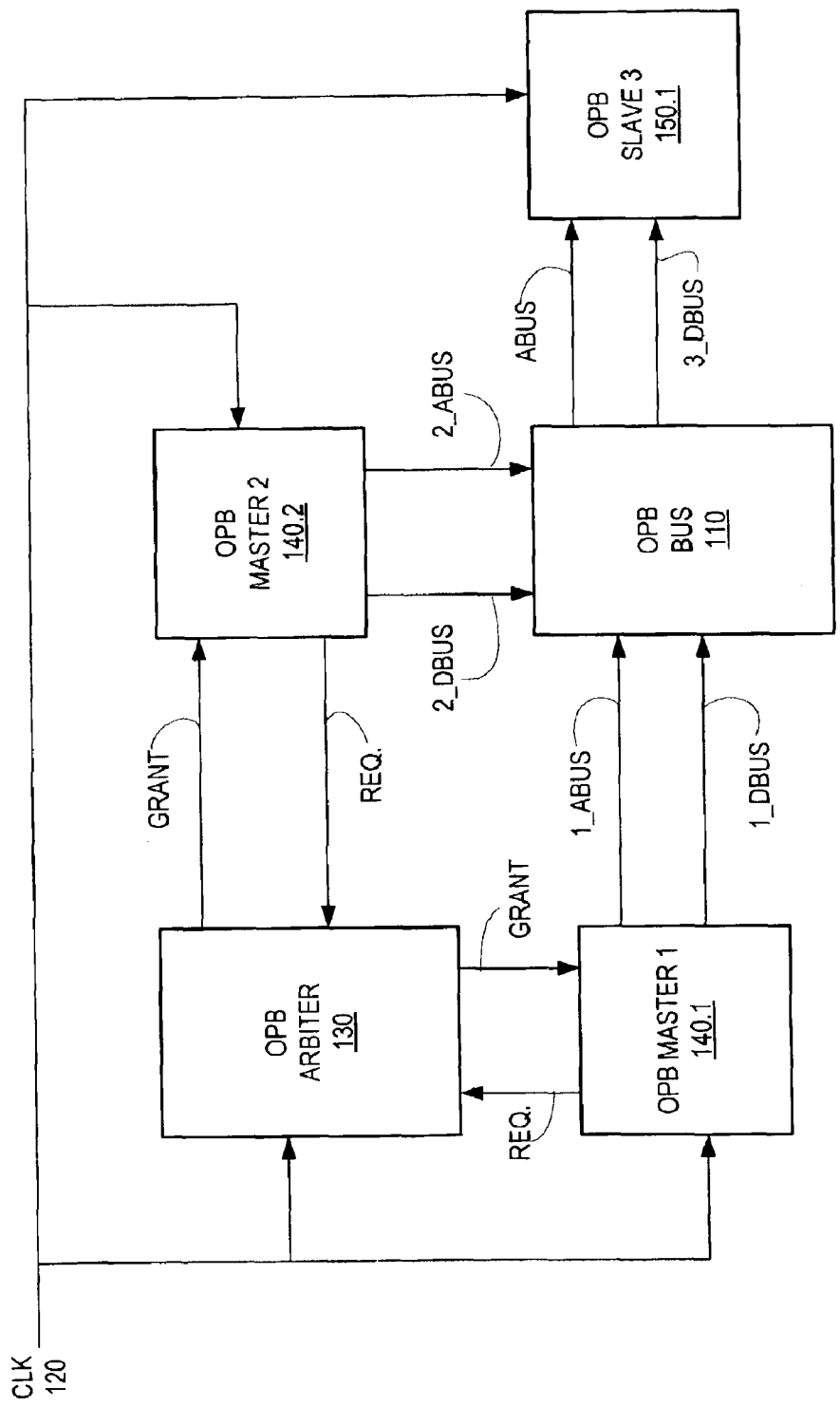
FIG. 1 illustrates uniform frequency implementation on an OPB, according to the prior art.
Figure 2:
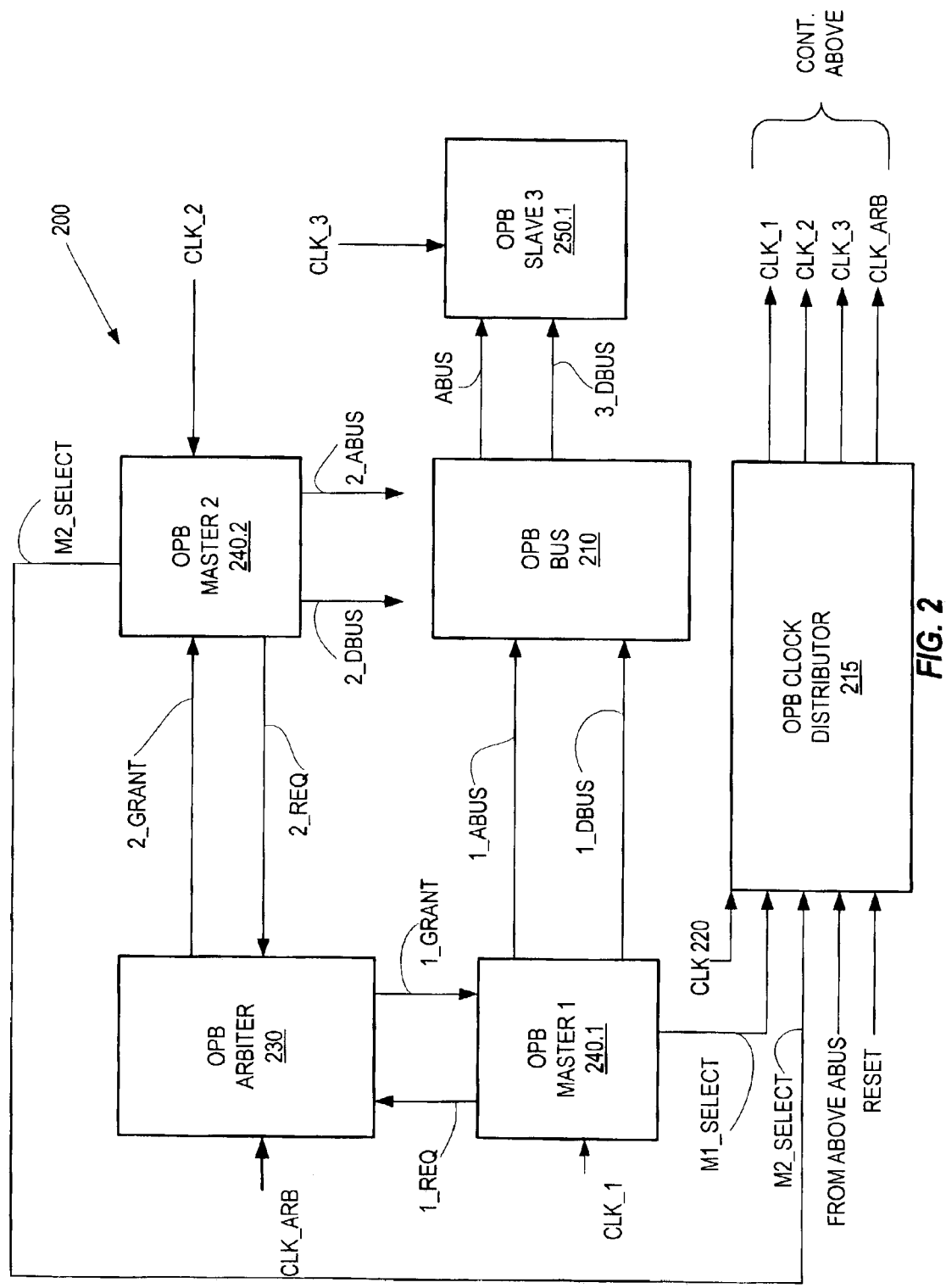
FIG. 2 illustrates a "frequency island" based implementation of an OPB, according to an embodiment of the present invention.

In an embodiment of the present invention, an embedded processor, also referred to as a micro-controller, is part of a system on a chip ("SOC"). Referring now to FIG. 2, aspects of the system 200 are illustrated. Even though SOC embedded processors generally have less complex features than that of desktop, workstation or server processors, nevertheless the system 200 of the present embodiment does have a bus hierarchy, according to which there is a PLB (not shown) and a OPB 210.

The buses in this embodiment operate on a synchronous shared-bus-based protocol, which in at least some respects is more simple than a switch-based protocol, and is scalable. According to the bus-based protocol, when a device is granted access to the bus, the device has exclusive use of the bus. This lends itself well to broadcast transactions. An advantage of a synchronous bus with a bus-based protocol is that transmission latencies are well behaved. That is, for example, when one of devices sends data out on the bus at a certain clock cycle it is known with some certainty that a receiver will receive the data a predetermined number of cycles later. This permits the sender to go on to other tasks in a coordinated fashion while the data is in transit. (In contrast to the bus-based protocol, a switch-based protocol requires non-blocking switches to permit multiple concurrent connections among devices on the bus.)

FIG. 2 particularly focuses on the OPB 210 and peripheral devices coupled to the OPB 210 for the system 200, including a first master device 240.1, a second master device 240.2 and a slave device 250.1. It should be understood that in other embodiments the system 200 may have more peripheral devices, including both master and slave devices, than are shown in this instance. The first master device 240.1 has its own address bus 1_abus and its own data bus 1_dbus ported to the OPB 210. Likewise, the second master device 240.2 has its own address bus 2_abus and its own data bus 2_dbus ported to the OPB 210. Each master device 240.1 and 240.2 is coupled to an OPB arbiter 230 by respective request lines 1_req and 2_req, and respective grant lines 1_grant and 2_grant, so that the masters 240.1 and 240.2 can request on their respective request lines that the OPB arbiter 230 grant them exclusive access to the bus 210. When granted, the arbiter 230 signals to the master 240.1 or 240.2 that the request has been granted on the masters respective grant line 1_grant or 2_grant.

The slave device 250.1 has its own data bus 3_dbus, but does not have its own address bus. Rather, the slave 250.1 shares a common address bus abus with any other slave devices (not shown) in the system 200. Although not explicitly shown, it should be understood that master devices 240.1 and 240.2 are also coupled to the address bus abus, so that one master can address the other for communication there between.

The system 200 further includes an OPB clock distributor 215, which receives an external clock signal on clock line clk 220 (which may be referred to herein as a "system" clock signal) and responsively generates respective subsystem clock signals on clock lines shown, clk_arb, clk_1, clk_2 and clk_3 connected to the respective system 200 devices, arbiter 230, master 240.1, master 240.2 and slave 250.1. According to the illustrated embodiment, the generated clock signals clk_1, clk_2, clk_3 and clk_arb are edge aligned with the received clock signal elk 220, which is at least two times faster than the generated clock signals. (For convenience, signals herein are referred to by the same names as the lines on which they are transmitted.)

The OPB clock distributor 215 also generates and selectively and glitchlessly synchronizes the subsystem clock signals clk_1, clk_2, clk_3 and clk_arb in response to a number of other received signals, essentially acting as a "wrapper" around the arbitrator 230. Specifically, clock distributor 215 receives signals from the respective masters 240.1 and 240.2 on select lines m1_select and m2_select, and receives whatever address is asserted on the slave address bus abus. The OPB clock distributor 215 also receives a reset signal on a reset line, as shown.

When the OPB bus is idle, none of the masters 240.1 and 240.2 are asserting their select signals on respective lines m1_select or m2_select, and the clock distributor 215 generates operating clock signals clk_1, clk_2, clk_3 and clk_arb for the respective devices 240.1, etc. at independent clock frequencies that are predefined for each of the devices 240.1, etc.

When a master 240.1 or 240.2 wants to communicate with another device, the master asserts a request signal on its respective request line 1_req or 2_req and waits for a grant from the arbiter 230. The arbiter 230 arbitrates any pending requests and grants access to the bus 210 to one of the requesters.

For example, arbiter 230 asserts 1_grant to master 240.1 responsive to a request on 1_req from master 240.1, among other requests. Responsive to the grant, master 240.1 asserts its m1_select, indicating to the clock distributor 215 that master 240.1 has exclusive access ("owns") the bus 210. Master 240.1 also asserts on its address bus 1_addr the address of the device, such as slave 250.1, to which the master 240.1 wants to communicate (the "target" device, or simply "target"), and in the case of a write operation asserts data for the target on its data bus 1_dbus. Upon seeing the select signal 1_select asserted by master 240.1 and the address for slave 250.1 asserted on the common address bus abus, the clock distributor 215 generates synchronous clock signals clk_1, clk_3 and clk_arb, for the master 240.1, slave 250.1 and arbiter 230, respectively, as will be described further herein below, permitting the master 240.1 and slave 250.1 to communicate on the bus 210. (As used herein, the term "synchronous clock signals" refers to clock signals that are not only have the same frequency, but are also phase aligned.) The clock distributor 215 maintains this synchrony for these clock signals clk_1, clk_3 and clk_arb as long as the select signal m1_select is asserted. Once the m1_select is deasserted, the clock distributor 215 once again generates operating clock signals clk_1, clk_3 and clk_arb for the respective devices 240.1, etc. at the predefined, independent clock frequencies.

Figure 4:
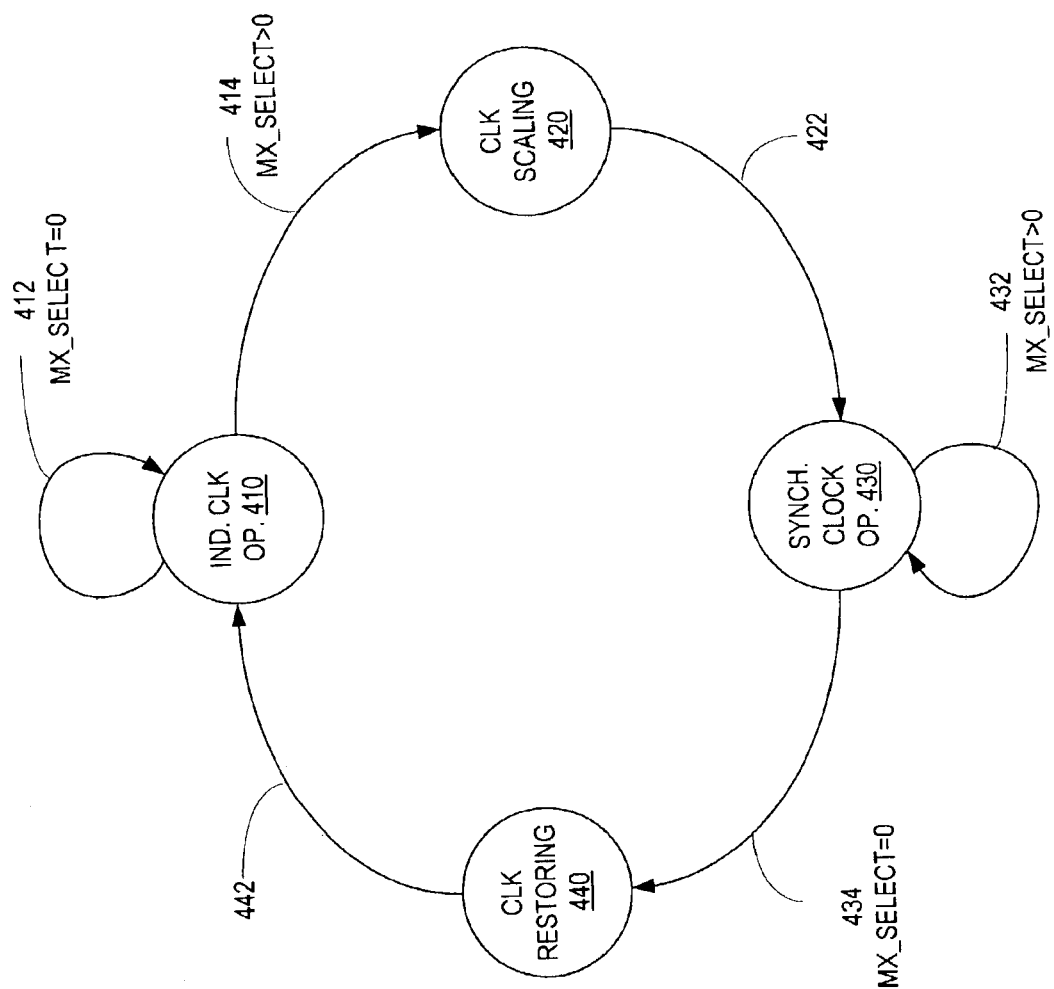
FIG. 4 illustrates a high level view of the operation of the OPB clock distributor, according to an embodiment of the present invention.

Referring now to FIG. 4, a generalized view of the logic of clock distributor 215 operation is illustrated. Responsive to an idle state of the bus 210, in which case there are no master select signals m1_select or m2_select asserted (shown in FIG. 4 collectively as "mx_select"), the clock distributor 215 assumes an independent clock operation state 410 in which it supplies clock signals clk_1, etc. to all the devices 240.1, etc. in accordance with predetermined, independent clock frequencies stored in a device attribute register (not shown). As long as no master select signals are asserted the clock distributor 215 continues 412 in the independent clock operation state 410. When one of the masters 240.1, etc. gets a grant, the master responsively asserts its select line m1 select, etc. and loads the address of a target device 240.2, 250.1, etc. onto the address bus abus. Responsively, the clock distributor 215 transitions 414 to a clock scaling mode 420, in which it decodes the select lines mx_select and the address bus abus to identify the master and the target, among other things. Then, the clock distributor 215 transitions at 422 to a mode 430 in which it glitchlessly scales the clock signals for the master, target and arbiter 230. State 430 continues 432 as long as the master select signal remains asserted, i.e., throughout the duration of communication between the master and target. Once the select signal is deasserted the clock distributor 215 responsively transitions 434 to a clock restoring mode 440, after which the clock signals transition 442 back to the independent clock operation state 410, supplying clock signals once again at the independent, predetermined frequencies.

It should be understood from the above that clock signals for masters and slaves not involved in a communication session continue operating at their predetermined, independent frequencies throughout the entire cycle illustrated in FIG. 4. Only the clocks for the arbiter, and the particular master and target involved in a (synchronous) communications session are subject to the dynamic clock scaling, synchronous operation and clock restoring described in FIG. 4.

Figure 5:
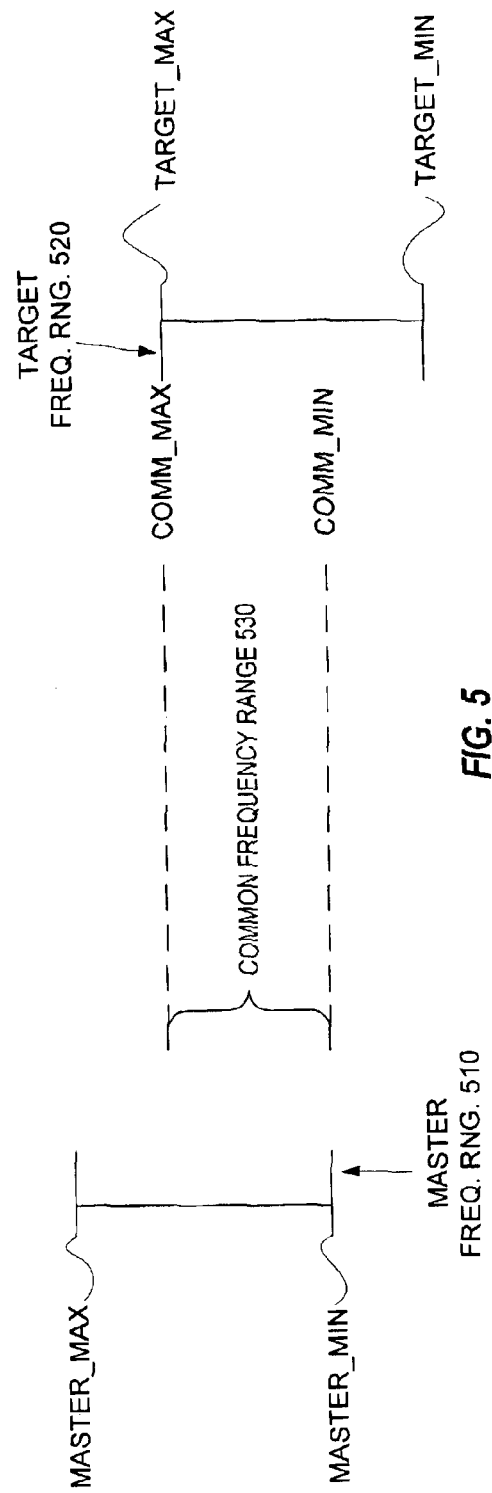
FIG. 5 illustrates a common frequency range for temporarily synchronous operation of a master and target, according to an embodiment of the present invention.

Referring now to FIG. 5, a common frequency range 530 for temporarily synchronous operation of a master and target is illustrated, according to an embodiment of the present invention. Each master has its own clock frequency range 510 bounded by a maximum frequency master_max and a minimum frequency master_min within which the master is capable operating. Likewise, each target device (which may also be a master) has its own clock frequency range 520 bounded by a maximum frequency target_max and a minimum frequency target_min.

The system 200 (FIG. 2) must be designed so that each pair of devices which are permitted to communicate with one another have a common frequency range 530. That is, for devices that can communicate with one another, the master frequency range 510 and the target frequency range 520 overlap one another as shown in FIG. 5. The overlapping range, referred to herein as the common frequency range 530, has its own maximum frequency comm_max determined by the lower of the two frequencies master_max and target_max and its own minimum frequency comm_min determined by the higher of the two frequencies master_min and target_min.

In operating state 420 (FIG. 4), in connection with identifying the master and target for the particular communication the clock distributor 215 (FIG. 2) determines the common frequency range 530 for each temporary communication session, as described immediately above, and then selects a single operating frequency within the common frequency range 530. In one embodiment, this selection is responsive to predetermined parameters, stored in registers (not shown) in the clock distributor 215, that indicate a particular policy. The policy balances tradeoffs including power consumption, latency in clock scaling and bandwidth. That is, for example, for a policy which gives maximum weight to bandwidth and less weight to power consumption, the parameters direct the selection to the maximum common frequency comm_max. For a policy which gives maximum weight to power consumption and less weight to bandwidth, the parameters direct the selection to the minimum common frequency comm_min.

Figure 3A:
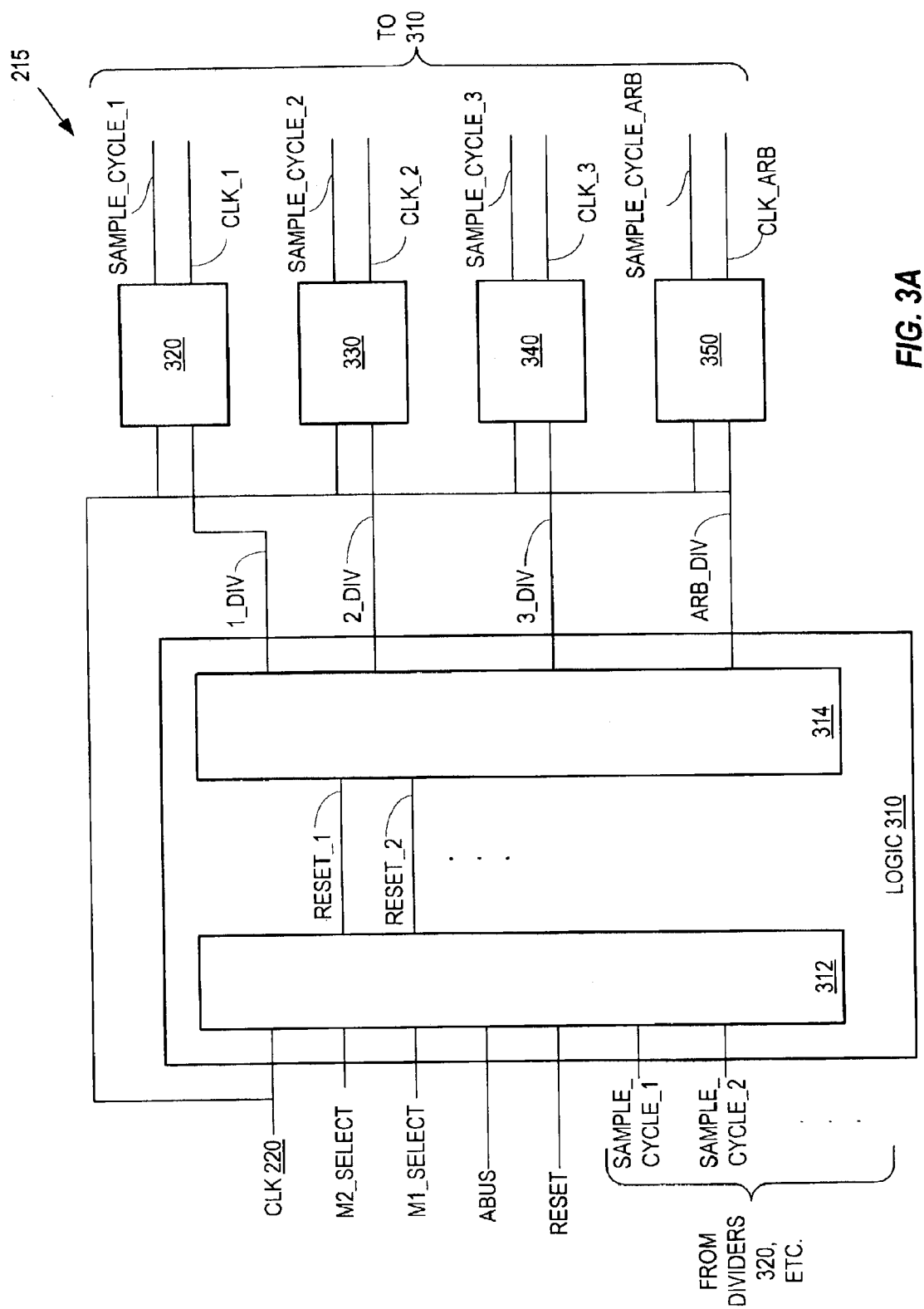
FIG. 3A illustrates additional details of an OPB clock distributor, including dynamically scalable dividers, according to an embodiment of the present invention.

Referring now to FIG. 3A, additional details are illustrated of the OPB clock distributor 215 of FIG. 2, including dynamically scalable dividers 320, 330, 340 and 350 for the respective devices 240.1, 240.2, 250.1 and 230 coupled to the OPB 210 (FIG. 2), according to an embodiment of the present invention. The dividers 320, etc. generate the previously mentioned subsystem clock signals clk_1, etc., as well as respective sample cycle signals sample_cycle_1 sample_cycle_2, sample_cycle_3 and sample_cycle_arb, and respective reset signals r reset_2, reset_3 and reset_arb, as will be described herein below. The clock distributor 215 has registers (not shown) for each divider 320, etc. that store divisor values for the respective dividers. The clock distributor 215 also includes logic circuitry 310 operable to receive the clock signal clk 220, master select signals m1_select and m2_select, address bus abus and reset signal and responsively generate and update the divisor values. Each divider 320, etc. reads its divisor value on its respective data lines 1_div, 2_div, 3_div and arb_div.

Figure 3B:
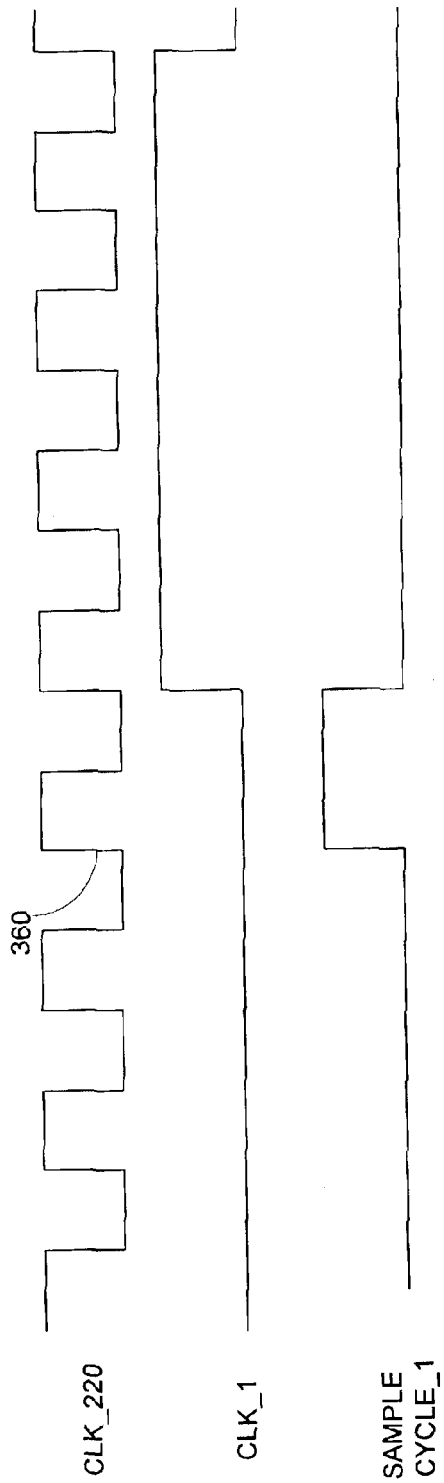
FIG. 3B illustrates timing of a sample cycle signal with respect to the clock signals input to and output by one of the dividers of FIG. 3A, according to an embodiment of the present invention.

FIG. 3B illustrates timing of one of the sample cycle signals sample_cycle_1 which is output by divider 320 (FIG. 3A) responsive to the clock signal clk 220, according to an embodiment of the present invention. (This illustrates timing that is typical for all the sample cycle signals and their corresponding subsystem clock signals.) In the illustration, during the independent operating state 410 (FIG. 4) divider 320 divides clock signal 220 by a divisor of four, thereby generating clock signal clk_1, as shown. In addition, responsive to the beginning of the cycle of clock signal 220 immediately preceding each positive phase of the clock signal clk_1 cycles, an instance of which is noted in FIG. 3B as 360, the divider 320 asserts the sample cycle signal sample_cycle_1 for one cycle of the clock signal clk_1. This sample cycle signal is used to coordinate glitchless switching to synchronous operation for a communication session between a master and target, as will now be further described. Glitchless switching refers to switching in such a manner that there are no unintended clock cycles or clock phases and all pulses meet minimum pulse width requirements for clocking.

Figure 6:
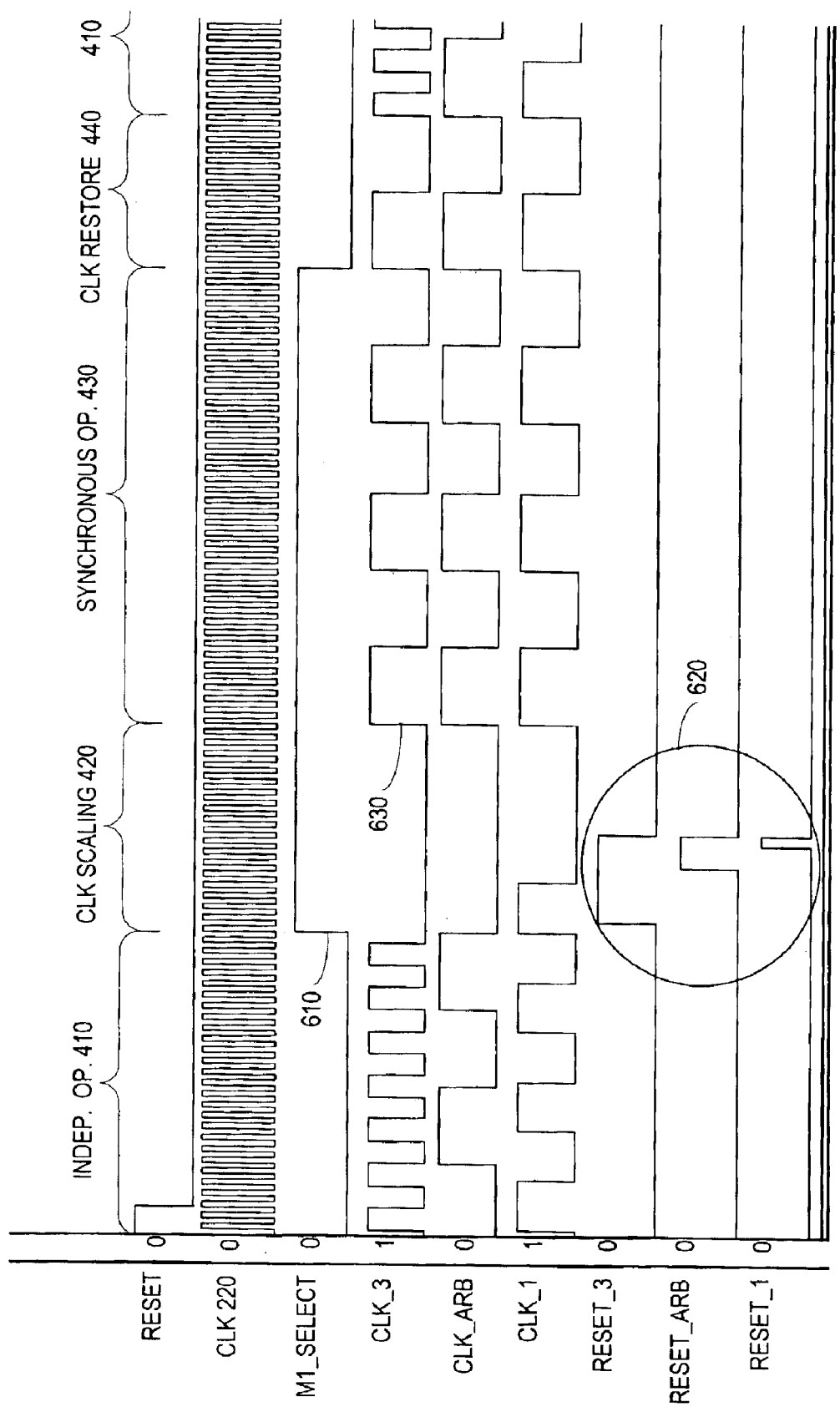
FIG. 6 illustrates timing of various signals in an OPB transaction between and master and target device, according to an embodiment of the present invention.

Referring now to FIG. 6, timing and logical interactions are illustrated for various signals in an OPB 210 (FIG. 2) "transaction," i.e., "communication session," between master 240.1 (FIG. 2) and target device slave 250.3, according to an embodiment of the present invention. The "reset" signal shown at the top of FIG. 6 is a system 200 reset. It resets the system at power-up so that the registers, such as those described above for the divisors, are correctly initialized. Initially, during the mode 410 (FIG. 4) in which all the clocks clk_1, etc. output by the clock distributor 215 (FIG. 2) are operating independently, the divider 320 reads a value of nine on 1_div causing the divider 320 to divide the received system clock signal clk 220 by nine for generating clk_1, the subsystem clock signal that governs the frequency of operation for master 240.1 (FIG. 2). At the same time, the distributor 215 has a value of four in the divisor register for divider 340, and accordingly asserts a value on 3_div causing the divider 340 (FIG. 3A) to divide the received system clock signal clk 220 by four for clk_3, the subsystem clock signal that governs the frequency of operation for slave 250.1 (FIG. 2), and similarly asserts a value on arb_div causing the divider 340 (FIG. 3A) to divide the received system clock signal clk 220 by fourteen for clk arb, the subsystem clock signal that governs the frequency of operation for arbiter 230 (FIG. 2).

Responsive to assertion of m1_select at 610, the clock distributor 215 transitions to the clock scaling mode 420. In this mode, the logic 310 (FIG. 3A) determines the identity of the master and target devices and selects a single common operating frequency for these devices, as previously described. Also, a first logic section 312 in logic 310 asserts respective reset signals for those of the master 240.1 (sample_cycle_1), slave 250.1 (sample_cycle_3) and arbiter 230 (sample_cycle_arb) that are identified for the upcoming communications session. In the illustrated instance this means asserting reset_1, reset_3 and reset_arb responsive to receiving the respective sample cycle signals sample_cycle_1, sample_cycle_3 and sample_cycle_arb (not shown in FIG. 6). (See FIG. 3B for an example of a sample cycle signal.). The logic 312 holds each these reset signals high as shown at 620 until the last one of them is asserted (responsive to the last arriving sample cycle signal. In the illustrated instance, sample_cycle_3 (not shown) arrives first, so that reset_3 is the first reset signal asserted. Sample_cycle_arb (not shown) arrives next, so that reset_arb is the next reset signal asserted. Finally, sample_cycle_1 arrives, so that reset_1 is the last reset signal asserted. Upon assertion of the last reset signal the reset signals are all deasserted by logic 312.

Responsive to detecting the falling reset signals, a second logic section 314 of logic 310 simultaneously asserts the new, common divisor value on the respective control lines, i.e., control lines 1_div, 3_div and arb_div, for the dividers 320, 340 and 350 (FIG. 3A) for the three devices. Responsive to the new divisor value, the received clock signal 220 (FIG. 3A) and a delay of one cycle of the new common frequency clock, the clock distributor 215 transitions 422 (FIG. 4) to the synchronous clock operation mode 430 and the dividers 320, etc. assert new clock signals clk_1, clk_3 and clk_arb, respectively, at 630. In this mode 430 the master, target and arbiter can temporarily communicate (for a "communications session" or "transaction") at the selected common frequency. Note that not only are the clock signals clk_1, clk_3 and clk_arb now operating at the same frequency, but they are also synchronized, since the three dividers 320, etc. generate their clock signal outputs from the same clock signal 220.

Responsive to deassertion of the master select signal m1_select the clock distributor 215 transitions to the clock restoring mode 440. This includes the logic 310 waiting one clock cycle of the common frequency clock signals clk_1, etc. Then, the clock distributor 215 returns to the independent clock operating mode, in which the independent frequency values are asserted on the respective control lines 1_div, 3_div and arb_div.

The description of the present embodiment has been presented for purposes of illustration, but is not intended to be exhaustive or to limit the invention to the form disclosed. In one alternative embodiment, glitchless clock scaling is done by multiplexing. According to this embodiment, the system includes a number of communication clocks having a variety of fixed frequencies. Once a determination is made regarding the frequency range shared between a master and target, as shown in FIG. 5 and described above, then the communication clock having the highest frequency in that range is selected. During the transaction, the master, target and the arbiter operating frequencies are scaled to this communication frequency, i.e., the three subsystems all operate from the selected communication clock. To accomplish this the subsystems have multiplexers fed by the communications clocks so that each subsystem can select a clock. The scaling cost of clocks in multiplexer based implementation is little higher than that of clock divider based implementation.

Although the embodiment described has primarily concerned the OPB, in another embodiment the methods and structures described are applied to the processor local bus ("PLB"). In one embodiment, the PLB is a high performance 64-bit address, 128-bit data bus providing an interface among a processor core and other peripherals, including the OPB and its peripherals. Masters on the PLB have their own respective data and address interfaces to the PLB. Slaves communicate on the PLB using a shared bus. Devices on the PLB work at different frequencies, just as do devices on the OPB. Although the aspects of the methods and structures described above are applicable, it should be also understood, however, that in the case of a PLB that supports overlapped transfers (also referred to as "address pipelining"), the PLB embodiment requires additional features or variations beyond those described herein.

Communication according to the PLB protocol includes the following phases:

1. The masters assert request signals for data transfer and also put a target address and other qualifiers on their address bus.

2. Address acknowledge phase. The arbiter gives a grant to one of the masters and the arbiter waits for the respective slave to acknowledge the address.

3. Data transfer phase. The master which received the address acknowledge from the slave, i.e., the "primary" master which received the address acknowledge from the "primary" slave, can now start transferring data (reading/writing) from/to the slave. At this point, now that the address acknowledge phase is over for the primary master and primary slave in their transaction (the "primary" transaction), another master (the "secondary" master) can go into the address acknowledge phase while the primary master is engaged in data transfer, and some other slave (the "secondary" slave) can give an address acknowledgement to the secondary master.

4. Data acknowledge phase. The primary slave asserts a rd_comp (for reading) or a wr_comp (for writing) to signify that the data transfer phase is over.

5. Now the secondary master can become the primary master and can go into the data transfer phase.

To support overlapping transactions, logic is included in the PLB portion of the system to de-couple address, read data and write data portions of the bus from one another so that address cycles can be overlapped, i.e., on the address and data buses shared by slaves, one master can be sending or receiving data to one slave on the data bus portion at the same time that another master can be addressing another slave on the address bus portion.

In the embodiment, the clock distributor includes additional logic, receives at least one additional input and generates at least one additional output. Specifically, in one embodiment the clock distributor receives and selectively redistributes an "address valid" signal from the arbiter, indicating validity of addresses asserted by masters on the address bus shared by slave devices. In order to apply the features of the present invention which enable synchronous transfers and otherwise permit independent frequency operation of subsystems, limitations are imposed on pipelining. That is, if a secondary master and target are the same as a primary master and target, they can use address pipelining. Otherwise, address pipelining is not permitted.

There is an address valid signal which tells the targets that the address on the address bus is valid and that the targets can start decoding it (to respond back to masters). This address valid is generated by the arbiter after the arbitration is done and the grant is given. In an embodiment, once the grant is given a few cycles are taken to scale all the frequencies for synchronous communication, during which the master, target and the bus clock are held up but the remaining devices are still clocked normally. This can create a problem if the address valid remains high because some slow slave can start responding to the address, which is not desirable. To deal with this, the address valid signal is held low until the scaling is done. Once the scaling is complete, the address valid becomes high and the operation continues as normal.

Many modifications and variations will be apparent to those of ordinary skill in the art. To reiterate, the embodiments were chosen and described in order to best explain the principles of the invention, the practical application, and to enable others of ordinary skill in the art to understand the invention. Various other embodiments having various modifications may be suited to a particular use contemplated, but may be within the scope of the present invention. Moreover, it should be understood that the actions in the following claims do not necessarily have to be performed in the particular sequence in which they are set out.

What is claimed is:

1. A method for communicating among subsystems coupled to a bus of a computer system, the method comprising the steps of:
   a) operating N subsystems at independent clock frequencies when the subsystems are not communicating with one another on the bus, wherein communication among the subsystems is by a bus-based protocol in which a subsystem granted access to the bus has exclusive use of the bus, wherein the subsystems are capable of operating at respective ranges of clock frequencies, and wherein step a) includes supplying clock signals on N respective clock lines to the subsystems from a clock distributor at predetermined, independent clock frequencies within the subsystems' own respective ranges;
   b) selecting first and second ones of the N subsystems for communicating on the bus, wherein in step a) the first and second ones of the N subsystems are supplied their clock signals on their respective ones of the N clock lines, wherein the clock signal supplied to first one of the subsystems is a higher frequency signal than the clock signal supplied to the second one of the subsystems; and
   c) operating the selected ones of the subsystems during a communication interval at clock frequencies selected responsive to the ones selected, so that communication can occur at shared clock frequencies between the selected ones of the subsystems, including different shared clock frequencies for respective different pairings of the subsystems, wherein step c) comprises the steps of;
   c1) identifying a clock frequency range shared by the selected first and second subsystem;
   c2) selecting, from within the shared clock frequency range a single clock frequency for a transaction between the first and second subsystems during the communication interval; and
   c3) supplying a clock signal of the selected cloak frequency to the first and second subsystems by the clock distributor on the first and second subsystems respective ones of the N clock lines.

2. The method of claim 1, wherein step c3) comprises the step of:
   concurrently supplying respective clock signals to other ones of the subsystems at their respective predetermined, independent frequencies.

3. The method of claim 2, wherein step c) comprises the step of communicating between the first and second subsystems at the selected single clock frequency for some time during the communication interval, and wherein the method comprises the step of the first and second subsystems returning to operating at respective independent clock frequencies responsive to completion of the communicating.

4. The method of claim 1, comprising the step of:
   overlapping address cycles, wherein the bus has address and data bus portions shared by slave subsystems, wherein the overlapping comprises communicating by a first master subsystem with a first slave subsystem on the data bus portion at the same time that a second master subsystem addresses a second slave on the address bus portion, wherein the overlapping is permitted only if the first and second master are the same master subsystem an the first and second slave are the same slave subsystem.

5. The method of claim 1, wherein in step c2) the single clock frequency is selected in response to a predetermined configuration, wherein the configuration is determined responsive to bandwidth and power consumption.

6. The method of claim 5, wherein the selected single clock frequency is a maximum frequency within the shared clock frequency range if the configuration is for optimizing bandwidth, and a minimum frequency within the shared clock frequency range the configuration is for optimizing power consumption.

7. A method for communication among subsystems coupled to a bus of computer system, the method comprising the steps of:
   a) operating in a first mode for the subsystems, wherein communication among the subsystems is by a bus-based protocol, according to which when a subsystems is granted access to the bus the subsystem has exclusive use of the bus, wherein the subsystems are capable of operating at respective ranges of clock frequencies, and wherein operating in the first mode comprises:
      supplying respective subsystem clock signals to the subsystems by a clock distributor, wherein the subsystem clock signals are supplied to the respective subsystems at predetermined, independent frequencies within the subsystems' own respective ranges:
   b) requesting access to the bus by a first one of the subsystems for communication with a second one of the subsystems;
   c) granting responsive to the request, the access to the first one of the subsystems by an arbiter one of the subsystems;
   d) asserting a select signal and the address of the second one of the subsystems by the first one of the subsystems responsive to the granting;

e) identifying a shared clock frequency range for the subsystem clock signal to the first and second ones of the subsystems by the clock distributor responsive to receiving the select signal for the first one of the subsystems and the address for the second one of the subsystems;

f) selecting, by the clock distributor, a single clock frequency for the ones of the subsystem clock signals to the first and second ones of the subsystems for the communication, wherein the selected clock frequency is within the shared clock frequency range; and g) operating in a second mode for the first, second and arbiter subsystems, wherein operating in the second mode comprises:
   supplying respective ones of the subsystem clock signals to the first, second and arbiter subsystems by the clock distributor at the selected shared clock frequency; and
   supplying respective ones of the subsystem clock signals to other ones of the subsystems in the system at the respective predetermined, independent frequencies;

wherein subsystem clock signals are supplied at lower frequencies than that of a system clock signal, and the method comprises the step of:

asserting sample cycle signals for the subsystem clock signals to coordinate glitchlessly switching from operating in the first mode to operating in the second mode, such a sample cycle signal being asserted for its corresponding subsystem clock signal one system clock cycle before the subsystem clock signal has a high phase.

8. The method of claim 7, wherein respective clock dividers of the clock distributor receive a system clock signal and respective divisor values and generate respective subsystem clock signals for supplying the first, second and arbiter subsystems.

9. The method of claim 7, wherein respective multiplexers of the clock distributor receive fixed frequency subsystem clock signals and select ones of the subsystem clock signals for supplying the first, second and arbiter subsystems.

10. The method of claim 7, comprising the step of:
asserting reset signals for certain ones of the subsystem clock signals to the first, second and arbiter subsystems, the reset signals being asserted responsive to the respective sample cycle signals for the certain subsystem clock signals.

11. The method of claim 10, comprising the step of:
deasserting the reset signals for the certain subsystem clock signals responsive to the last sample cycle signals asserted among the sample cycle signals for the certain subsystem clock signals.

12. The method of claim 11, comprising the step of:
switching to operating in the second mode responsive to the deasserting of the reset signals for the certain subsystem clock signals.

13. The method of claim 7, wherein in step f) the single clock frequency is selected in response to a predetermined configuration, wherein the configuration is determined responsive to bandwidth and power consumption.

14. The method of claim 13, wherein the selected single clock frequency is a maximum frequency within the shared clock frequency range if the configuration is for optimizing bandwidth, and a minimum frequency within the shared clock frequency range the configuration is for optimizing power consumption.

15. A computer system comprising:
N subsystems coupled to a bus, wherein communication among the subsystems includes communicating by a bus-based protocol in which one of the subsystems granted access to the bus has exclusive use of the bus, the subsystems are capable of operating at respective ranges of clock frequencies;

a clock distributor operable to supply respective subsystem clock signals on N respective clock lines to the subsystems in a first operating mode at predetermined, independent frequencies within the subsystems' own respective ranges; and an arbiter for arbitrating requests by ones of the subsystems for access the bus, wherein the clock distributor is operable, responsive to determining that a first one of subsystems has been granted access to the bus by the arbiter for communication with a second one of the subsystems, to identify a shared clock frequency range for the first and second one of the subsystems and select a single clock frequency for the communication, wherein the selected clock frequency is within the shared clock frequency range, wherein the clock distributor operable to operate in a second mode for the first, second and arbiter subsystems, in which the clock distributor supplies respective ones of the subsystem clock signals to the first, second and arbiter subsystems by the clock distributor at the selected, shared clock frequency, and supplies respective ones of the subsystem clock signals to other ones of the subsystems in the system at the respective predetermined, independent frequencies, and wherein the clock distributor supplies the clock signals to the subsystems on their respective ones of the N clock lines for both the first and second operating modes, and wherein the clock signal supplied to the first one of the subsystems in the first operating mode is a higher frequency signal than the clock signal supplied to the second one of the subsystems.

16. The apparatus of claim 15 comprising logic for de-coupling address, read data and write data portions of the bus from one another so that address cycles a be overlapped, wherein on address and data bus portions shared by slave subsystems a first master subsystem can be sending or receiving data to a first slave subsystem on the data bus portion a the same time that a second master subsystem can be addressing a second slave on the address bus portion, and wherein the logic is operable to permit the overlapping of addresses only if the first and second master are the same master subsystem and the first and second slave are the same slave subsystem.

17. The system of claim 15, wherein the single clock frequency is selected in response to a predetermined configuration, wherein the configuration is determined responsive to bandwidth and power consumption.

18. The system of claim 17, wherein the selected single clock frequency is a maximum frequency within the shared clock frequency range if the configuration is for optimizing bandwidth, and a minimum frequency within the shared clock frequency range if the configuration is for optimizing power consumption.

19. A computer system comprising:
subsystems coupled to a bus, wherein communication among the subsystems is by a bus-based protocol in which one of the subsystems granted access to the bus has exclusive use of the bus, the subsystems are capable of operating at respective ranges of clock frequencies;

a clock distributor operable to supply respective subsystem clock signal to the subsystems in a first operating mode at predetermined, independent frequencies within the subsystems's own respective ranges; and an arbiter for arbitrating requests by ones of the subsystems for access to the bus, wherein the clock distributor is operable, responsive to determining that a first one of the subsystems has been granted access to the bus by the arbiter for communication with a second one of the subsystems, to identify a shared clock frequency range for the first and second one of the subsystems and select a single clock frequency for the communication, wherein the selected clock frequency is within the shared clock frequency range;

wherein the first subsystem asserts a select signal and asserts on an address bus an address of the second one of the subsystems responsive to receiving the grant indication from the arbiter, and wherein the clock distributor receives the select signal and reads the address on the address bus in order to make the determination that the first one of the subsystems has been granted access to the bus by the arbiter for communication with the second one of the subsystems;

wherein the clock distributor is operable to operate in a second mode for the first, second and arbiter subsystems, in which the clock distributor supplies respective ones of the subsystem clock signals to the first, second and arbiter subsystems at the selected, shared clock frequency, and supplies respective ones of the subsystem clock signals to other ones of the subsystems in the system at the respective predetermined, independent frequencies;

wherein the first and second subsystems communicate at the selected, shared clock frequency and responsive to completion of the communication the select signal is deasserted by the first subsystem and the first and second subsystems return to operation in first mode; and wherein the subsystem clock signals are supplied at lower frequencies than that of a system clock signal, and the clock distributor asserts sample cycle signals for the subsystem clock signals to coordinate glitchlessly switching from operating in the first mode to operating in the second mode, such a sample cycle signal being asserted for its corresponding subsystem clock signal one system clock cycle before the subsystem clock signal has a high phase.

20. The computer system of claim 19, wherein the clock distributor comprises clock dividers operable to receive a system clock signal respective divisor values and generate respective ones of the subsystem clock signals for supplying the first, second and arbiter subsystems.

21. The computer system of claim 19, wherein the clock distributor comprises respective multiplexers operable to receive fixed frequency subsystem clock signals and select ones of the subsystem clock signals for supplying the first, second and arbiter subsystems.

22. The computer system of claim 19, wherein the clock distributor asserts reset signals for certain ones of the subsystem clock signals to the first, second and arbiter subsystems, the reset signals being asserted responsive to the respective sample cycle signals for the certain subsystem clock signals.

23. The computer system of claim 22, wherein the clock distributor deasserts the reset signals for the certain subsystem clock signals responsive to the last sample cycle signals asserted among the sample cycle signals for the certain subsystem clock signals.

24. The computer system claim 23, wherein the clock distributor switches to operating in the second mode responsive to the deasserting of the reset signals for the certain subsystem clock signals.

25. The system of claim 19, wherein the single clock frequency is selected in response to a predetermined configuration, wherein the configuration is determined responsive to bandwidth and power consumption.

26. The system of claim 25, wherein the selected single clock frequency is a maximum frequency within the shared clock frequency range if the configuration is for optimizing bandwidth, and a minimum frequency within the shared clock frequency range the configuration is for optimizing power consumption.

* * * * *